United States Patent
Bala et al.

(10) Patent No.: US 6,272,154 B1
(45) Date of Patent: Aug. 7, 2001

(54) RECONFIGURABLE MULTIWAVELENGTH NETWORK ELEMENTS

(75) Inventors: Krishna Bala, New York City, NY (US); John Gamelin, Red Bank, NJ (US); W. John Tomlinson, Princeton, NJ (US); Charles A. Brackett, Mendham, NJ (US)

(73) Assignee: Tellium Inc., Oceanport, NJ (US)

(*) Notice: Subject to any disclaimer, the term of this patent is extended or adjusted under 35 U.S.C. 154(b) by 0 days.

(21) Appl. No.: 09/182,644

(22) Filed: Oct. 30, 1998

(51) Int. Cl.$^7$ .................................................... H04J 3/04
(52) U.S. Cl. ........................... 370/535; 359/341; 359/127
(58) Field of Search .................................. 370/535, 222, 370/395, 127; 455/600, 601, 617, 607; 359/128, 134, 139, 341, 119, 110

(56) References Cited

U.S. PATENT DOCUMENTS

| | | | |
|---|---|---|---|
| 4,821,255 | 4/1989 | Kobrinski | 370/3 |
| 5,303,078 | 4/1994 | Brackett et al. | 359/139 |
| 5,457,556 | 10/1995 | Shiragaki | 359/117 |
| 5,530,575 | 6/1996 | Acampora et al. | 359/128 |
| 5,712,932 * | 1/1998 | Alexander et al. | 359/127 |
| 5,751,454 | 5/1998 | MacDonald et al. | 359/119 |
| 5,903,371 * | 5/1999 | Arecco et al. | 359/119 |
| 5,959,767 * | 9/1999 | Fatehi et al. | 359/341 |
| 6,084,694 | 7/2000 | Milton et al. | 359/124 |

OTHER PUBLICATIONS

Robert Gaudino, MOSAIC: A Multiwavelength Optical Subcarrier Multiplexed Controlled Network, IEEE, 1270–1275, Sep. 1998.*

Chang et al., "Multiwavelength Reconfigurable WDM/ATM/SONET Network Testbed," *Journal of Lightwave Technology*, vol. 14, No. 6, pp. 1320–1340, Jun. 1996.

Lee et al., "Routing and Switching in a Wavelength Convertible Optical Network," IEEE Infocom '93 Conference: Networking: Foundation for the Future, vol. 2, pp. 578–585, Mar. 28, 1993.

* cited by examiner

Primary Examiner—Wellington Chin
Assistant Examiner—Premell Jones
(74) Attorney, Agent, or Firm—Morgan, Lewis & Bockius LLP (57) ABSTRACT

A reconfigurable multiwavelength network element includes a first demultiplexer unit for demultiplexing a first multiplexed optical signal from a first optical fiber into a first plurality of optical outputs; a second demultiplexer unit for demultiplexing a second multiplexed optical signal from a second optical fiber into a second plurality of optical outputs; a first multiplexer unit having first optical inputs for receiving signals to be multiplexed together; a second multiplexer unit having second optical inputs for receiving signals to be multiplexed together; and a cross-connect unit having first and second portions, the first portion directing signals received from at least a first one of the first plurality of optical outputs and a first one of the second plurality of optical outputs to a first one of the first optical inputs and a first one of the second optical inputs, the second portion directing signals received from at least a second one of the first plurality of optical outputs and a second one of the second plurality of optical outputs to a second one of the first optical inputs and a second one of the second optical inputs.

14 Claims, 5 Drawing Sheets

RECONFIGURABLE MULTIWAVELENGTH NETWORK ELEMENTS

The present application hereby incorporates by reference "Reconfigurable Multiwavelength Network Elements: A Proposal for the MONET Washington, DC Field Experiment Extension" submitted by Tellium, Inc. to Bell Communications Research, Inc. (Final Revision, Dec. 3, 1997) and "Multiwavelength Network Elements For the MONET Field Experiment Extension: Hardware and Software Functional Specifications" by Tellium, Inc. (Release 1.0, Mar. 30, 1998).

BACKGROUND OF THE INVENTION

The present invention relates to multiwavelength network elements for use in an optical network system.

The volume of information communicated through modern communications networks has expanded dramatically in recent years and is projected to continue expanding in the future. The ever-increasing demand for communications services will soon overwhelm the capacity of current communications networks. Accordingly, new communications systems are required to meet the needs and demands of modern users. Multiwavelength optical network communications systems are ideally suited to transfer huge volumes of information. A multiwavelength optical network is composed of multiple network elements coupled together by optical fiber transmission lines.

SUMMARY OF THE INVENTION

Accordingly, the present invention is directed to a network element for use in a multiwavelength optical network. Features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

In accordance with preferred embodiments of the present invention, a reconfigurable multiwavelength network element comprises a first demultiplexer unit for demultiplexing a first multiplexed optical signal from a first optical fiber into a first plurality of optical outputs; a second demultiplexer unit for demultiplexing a second multiplexed optical signal from a second optical fiber into a second plurality of optical outputs; a first multiplexer unit having first optical inputs for receiving signals to be multiplexed together; a second multiplexer unit having second optical inputs for receiving signals to be multiplexed together; and a cross-connect unit having first and second portions, the first portion directing signals received from at least a first one of the first plurality of optical outputs and a first one of the second plurality of optical outputs to a first one of the first optical inputs and a first one of the second optical inputs, the second portion directing signals received from at least a second one of the first plurality of optical outputs and a second one of the second plurality of optical outputs to a second one of the first optical inputs and a second one of the second optical inputs.

In another aspect, a reconfigurable multiwavelength network element comprises a first demultiplexer unit having a first input for receiving a first multiwavelength signal over a first optical fiber and having first outputs for outputting at least a first signal and a second signal demultiplexed from the first multiwavelength signal; a second demultiplexer unit having a first input for receiving a second multiwavelength signal over a second optical fiber and having second outputs for outputting at least a third signal and a fourth signal demultiplexed from the second multiwavelength signal; a cross-connect unit having first and second portions, wherein the first portion includes a first receiver to receive the first signal, a second receiver to receive the third signal, and a third receiver to receive a first client add signal, the first portion directing the first signal, the third signal, and the first client add signal to first, second, and third transmitters, wherein the second portion includes a fourth receiver to receive the second signal, a fifth receiver to receive the fourth signal, and a sixth receiver to receive a second client add signal, the second portion directing the second signal, the fourth signal and the second client add signal to fourth, fifth, and sixth transmitters; a first multiplexer unit interconnected with the third transmitter and one of the first and fourth transmitters to multiplex together the respective signals, wherein the other one of the first and fourth transmitters provides a first client drop signal; and a second multiplexer unit interconnected with the sixth transmitter and one of the second and fifth transmitters to multiplex together the respective signals, wherein the other one of the second and fifth transmitters provides a second client drop signal.

In another aspect, a reconfigurable multiwavelength network element comprises a demultiplexer unit for receiving and demultiplexing a multiplexed optical signal, the demultiplexer unit having optical outputs corresponding to channels of the multiplexed signal; a first multiplexer unit having optical inputs for receiving signals to be multiplexed together; and a cross-connect unit to direct signals received from the optical outputs and a client add port to the optical inputs and a client drop port.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In accordance with the present invention, a network element may be a multiwavelength add/drop multiplexer (WADM) or a multiwavelength fiber amplifier (WAMP).

The network elements allow multiwavelength networking functionality and design which are configurable, interoperable, and scalable. The network element uses multiplexer, demultiplexer, and cross-connect functions as basic building blocks.

The WADMs and WAMPs operate on predetermined wavelengths configured to support complete access to all wavelengths at each add/drop node and to be operable in a wavelength division multiplexed (WDM) ring configuration. The WADM design may provide per-wavelength power management and monitoring, amplifier gain stabilization, automatic path-protection switching, automatic switch-state confirmation, and completely integrated network element control functions and interfaces.

The network elements function at any desired data rate—such as SONET OC-3, OC-12, OC-48, and their concatenated versions. The network element also provides the advanced features and functionalities such as wavelength adaptation, client interface configurability within groups, wavelength conversion within wavelength groups, drop/continue as well as broadcast/multicast, fully redundant internal switch fabric protection, advanced performance monitoring using SONET overhead byte access, upgradeability with respect to the number of wavelengths, and large network scalability.

One embodiment of the network element may utilize an opto-electronic solution to the interface and switching operations of the WADM, thereby offering significant near- and long-term advantages to expedite the commercial deployment of the hybrid optical and electronic systems. For example, the approach according to the present invention easily provides wavelength adaptation and interchange, drop and continue, broadcast and selective broadcast functions, extension to higher numbers of wavelengths, and extensions to very large-scale networks. Moreover, this system enables networks to be managed in an evolutionary manner.

Thus, large-scale networks with a high degree of interoperability—in both a multivendor and a multi-network-provider environment—are achieved.

Figure 1:
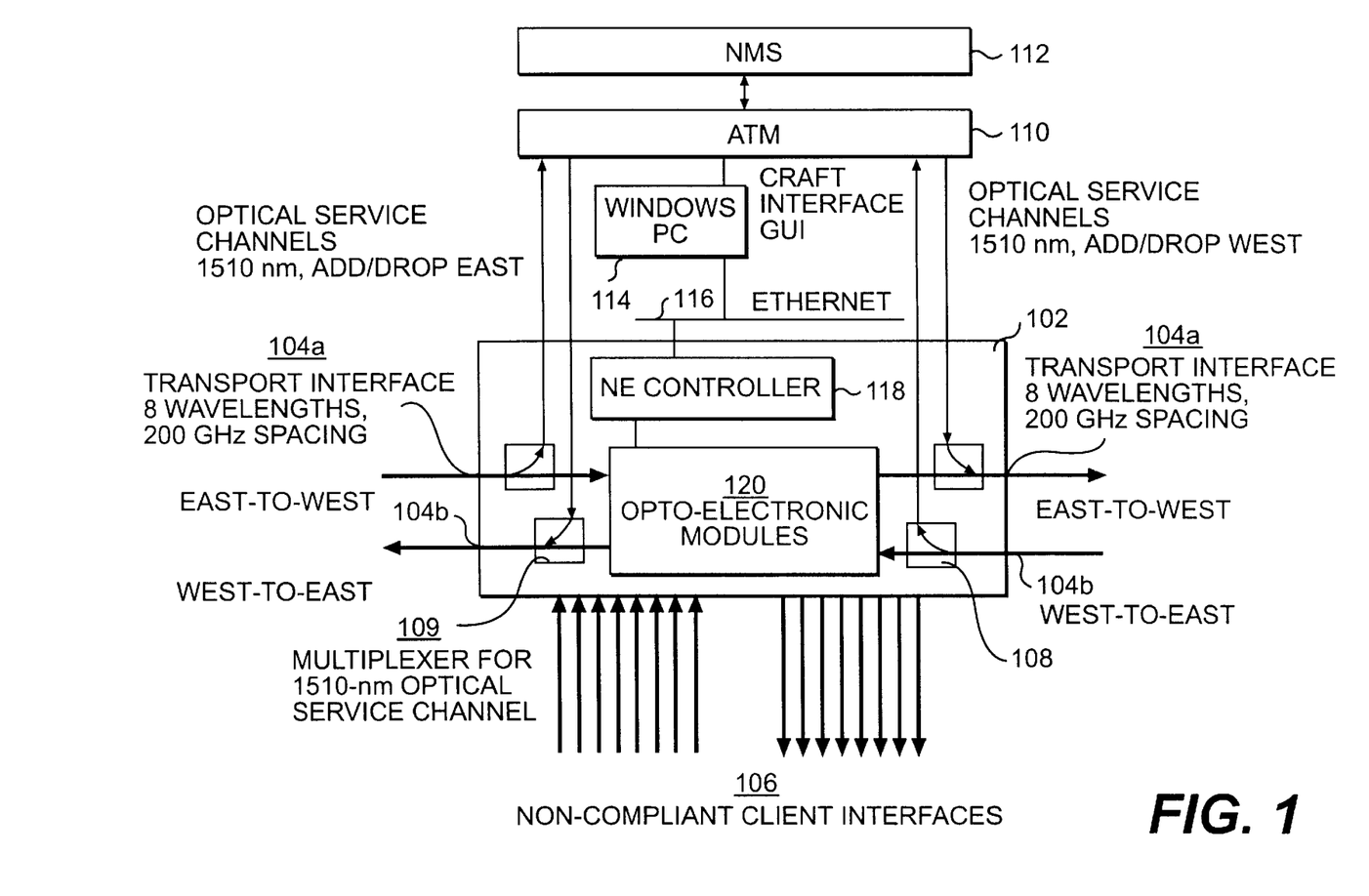
FIG. 1 is a diagram showing the basic network element configuration according to one embodiment of the present invention.

One embodiment of a network element in accordance with the present invention is shown in FIG. 1, which illustrates the network element 102 deployed in a bi-directional ring network architecture. That is, FIG. 1 shows that the network element 102 may have a multiwavelength transport interface (TI) 104a for accommodating an East-to-West optical fiber and a multiwavelength transport interface 104b for accommodating a West-to-East optical fiber. As used herein, the terms "West-to-East" and "East-to-West" are intended to refer to fibers carrying signals in different paths and not to refer to strict geographical directions. While FIG. 1 shows a bidirectional ring architecture, it should be understood that the network element of the present invention may be configured for use in other network architectures. In this regard, the network element may be configured with a single transport interface or, alternatively, three or more transport interfaces.

In the illustrated embodiment, each transport interface 104a, 104b receives a multiwavelength optical signal. For example, the multiwavelength optical signal may include eight wavelengths with 200 GHz spacing. It should be understood that, in accordance with the present invention, the number of wavelengths carried by the multiwavelength optical signal and the spacing between wavelengths may vary.

The network element 102 may support a plurality of client interfaces. When configured as a WAMP element, the network element 102 does not require client interfaces. For example, the embodiment shown in FIG. 1 supports eight bidirectional single-wavelength client interfaces 106. Each client interface 106 may be configured in any of a number of ways. In other embodiments, the client drop signals can be at the same wavelength as was received at the transport interface input. In one embodiment, the client interfaces 106 are non-compliant client interfaces (NCIs), for which the client-add signal can be at any wavelength in the range 1290 to 1580 nm and the client-drop signals are at a wavelength of 1310 nm.

As shown in FIG. 1, the network element 102 may include demultiplexers 108 to extract an optical service channel (OSC) signal from the input fibers of the transfer interfaces 104a, 104b. For example, the OSC signals may be provided at 1510 nm. The OSC signals are connected to input ports on an asynchronous transfer mode (ATM) switch 110 or any other protocol that may be used on the OSC. Similarly, the network elements 102 may include multiplexers 109 to add OSC signals from the ATM switch 110 to the output fibers of the transfer interfaces 104a, 104b.

The network element further includes opto-electronic modules 120 for processing the input multiwavelength optical signals and the client-add signals and for outputting the processed signals to output fibers and to client-drop interfaces. The opto-electronic modules 120 are operated under the control of network element controller 118.

A network management system (NMS) 112 may be connected to the network element 102 through an ATM interface on the ATM switch 110 to manage the network element as part of a network. The NMS, for example, provides the network element with instructions on how to configure the signal paths through the network element, and retrieves and analyzes information on the status, performance and alarms of the network element. Of course, NMS 112 may be connected to the network element 102 by any suitable media and using any suitable protocol.

An interface device 114 may connect to the ATM switch 110 to permit communications with NMS 112 and/or other equipment. Interface device 114 may also connect, for example, through an ethernet bus 116, to the network element controller 118 of the network element 102. In a preferred embodiment, the interface device 114 provides a graphical user interface (GUI). One possible such interface device is a PC operating on a Windows PC platform. The interface device 114 provides the interface between the NMS 112 and the network element controller 118, and also provides a craft interface GUI. In this embodiment, the network element 102 does not perform any processing of the OSC signals, other than transferring the optical signals at the transfer interfaces 104a and 104b.

Figure 2:
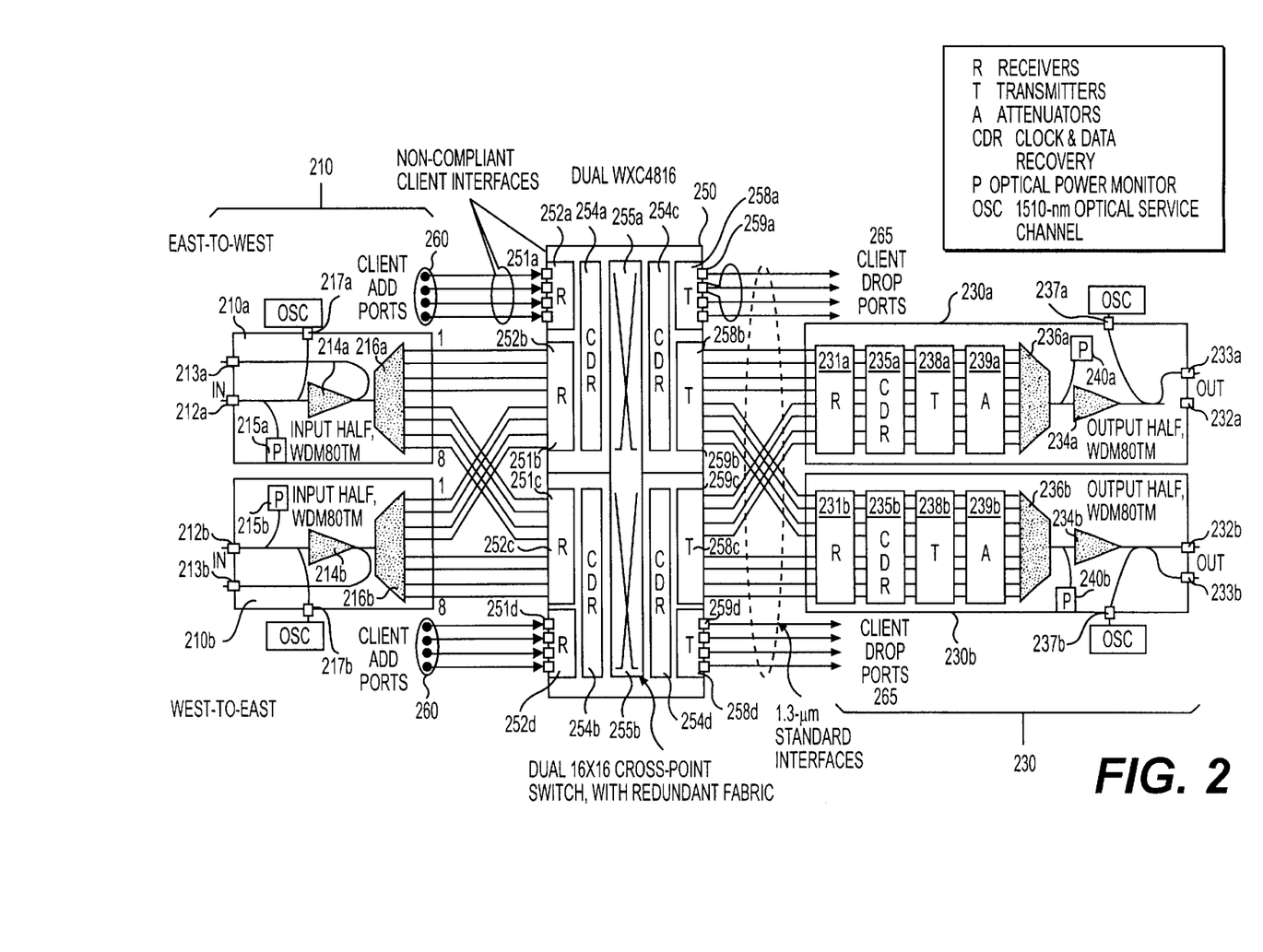
FIG. 2 is a diagram showing the detailed configuration of the WADM network element according to the embodiment of FIG. 1.

FIG. 2 shows a detailed configuration of a network element 200 according to one embodiment of the present invention. For ease of explanation, FIG. 2 shows a WADM element 200 with all signals propagating from left to right. The WADM element 200 comprises a multiwavelength terminal demultiplexer 210, a multiwavelength terminal multiplexer 230, and a cross-connect 250. The terminal demultiplexer 210 and terminal demultiplexer 230 may be embodied by two or more multiwavelength multiplexer/demultiplexer units, for example, the TELLIUM MarathonTM multiwavelength terminal multiplexer. The cross-connect 250 may be embodied by the TELLIUM Aurora 4816 cross-connect. The WAMP network elements are not shown in FIG. 2, but preferably include the Tellium MarathonMA multiwavelength amplifier.

The multiwavelength terminal demultiplexer 210 may include one or more demultiplexer blocks, for example, demultiplexer blocks 210a and 210b, as shown in FIG. 2. The multiwavelength terminal demultiplexer 210 may, of course, include more than two demultiplexer blocks. Each demultiplexer block 210a, 210b receives a multiwavelength optical signal at an input port 212a, 212b. For example, in a bidirectional ring architecture deployment, demultiplexer block 210a may receive a first multiwavelength optical signal propagating in a first direction (e.g., East-to-West) and second demultiplexer block 210b may receive a second multiwavelength optical signal propagating in a second direction (e.g., West-to-East). The multiwavelength optical signals are supplied to optical amplifiers 214a, 214b. The amplified signals are input to wavelength division demultiplexers 216a, 216b, where the amplified multiwavelength signals are separated into a plurality of optical signals. As shown in the embodiment illustrated in FIG. 2, where each multiwavelength optical signal includes eight different wavelengths, the wavelength division demultiplexers 216a, 216b may generate eight output signals.

The multiwavelength terminal demultiplexer 210 may include a demultiplexer or filter arrangement (not shown) for separating OSC signals from the multiwavelength optical signals. As noted above, the OSC signals may be provided, for example, at 1510 nm. In the arrangement shown in FIG. 2, the OSC signals may output to ports 217a, 217b. Further, the multiwavelength terminal demultiplexer 210 may include optical power monitoring equipment. FIG. 2 shows optical power monitors 215a, 215b for monitoring the optical power of the multiwavelength optical signal. A tap may be used to provide a sample of the multiwavelength optical signal to the optical power monitors 215a, 215b. Additional output ports, e.g., output ports 213a, 213b, may be provided to output samples of multiwavelength optical signals, e.g., for analysis of the multiwavelength signal with external test instruments.

The demultiplexed signals from the multiwavelength terminal demultiplexer 210 together with client-add signals are supplied to inputs 251 of cross-connect 250. The client-add signals may be provided from client-add ports 260. Cross-connect 250 rearranges the input optical signals on inputs 251 and couples the rearranged signals to outputs 259. Some of the output signals are coupled to client drop ports 265. Others are coupled to wavelength terminal multiplexer 230 for transmission over the multiwavelength optical network. The client add/drop ports 260 and 265 allow users to make connections during normal operation of the system. Preferably, the client add/drop ports 260 and 265 use SC/UPC optical fiber connectors. While FIG. 2 shows the client add/drop ports as using optical signals, electrical signals may alternatively be provided to the client add/drop ports. In this manner, the client adds are applied in electrical form to the cross-connect 255 and the client drops may be output in electrical form from the cross-connect switch 255.

Details of cross-connect 250 will now be provided. As shown in the embodiment of FIG. 2, a first group of demultiplexed signals from each of multiplexer blocks 210a, 210b are connected to a first set of inputs 251b of the cross-connect 250, and a second group of demultiplexed signals from multiplexer blocks 210a, 210b are connected to a second set of inputs 251c of cross-connect 250. A first group of client-add signals are provided to inputs 251a and a second group of client-add signals are provided to inputs 251d.

Further, as shown in FIG. 2, the demultiplexed wavelength signals 1–4 from demultiplexer blocks 210a and 210b are connected to inputs 251 b and demultiplexed wavelength signals 5–8 from blocks 210a and 210b are connected to inputs 251c. Cross-connect 250 may be embodied by a single dual cross-connect, where inputs 251a and 251b correspond to one half of the dual cross-connect and inputs 251c and 251d correspond to a second half of the dual cross-connect. In the illustrated embodiment of FIG. 2, each half of the dual cross-connect 250 can have sixteen input and output ports, but only twelve input and output ports are enabled on each half. The additional four port pairs on each half can be enabled as desired. Of course, cross-connect 250 may be embodied as a single component or multiple separate cross-connect units operating together.

The embodiment of cross-connect 250 shown in FIG. 2 is a hybrid opto-electrical cross-connect. Alternatively, the cross-connect 250 may be an all-optical arrangement. In accordance with FIG. 2, inputs 251a–251d may couple to opto-electrical receivers 252a–252d for detecting and converting the received optical signals to electrical signals. The electronic signals are processed by electronic cross-connect switches 255. Cross-connect switches 255 function under software control to couple input signals to selected outputs. The electronic cross-connect switches 255 may be provided in a single unit or in multiple switch units, such as switch units 255a and 255b. If a dual cross-connect switch 255 is used, electronic signals may be supplied to each half of the dual unit, as shown in FIG. 2. If each multiwavelength optical signal carries eight wavelengths, then a 16×16 cross-connect switch 255 may be used. The cross-connect 250 shown in FIG. 2 may also include a redundant pair of cross-connect switches (not shown) and, in the event of a switch failure, all or some signals may be connected to the backup switches.

Clock and data recovery (CDR) circuitry 254 may be provided before, after, or both before and after the cross-connect switches 255. Providing CDR circuitry 254 at the output side serves to eliminate jitter introduced by the cross-connect 255. The CDR circuitry 254 may be programmable for flexibility of operation. For example, the CDR circuitry 254 may perform clock and data recovery functions for signals at OC-48, OC-12, or OC-3 data rates. For SONET OC-48 signals, the CDR circuitry 254 may also monitor the J0 and B1 bytes of the SONET overhead data, both before and after the cross-connect, providing information on the identity and bit error rate (BER) of each such signal, and confirming the operation of the cross-connect.

Opto-electric transmitters 258 convert the electronic signals received from the cross-connect switches 255 to optical signals, for example, at 1.3 $\mu$m. The signals to be dropped are coupled to the client-drop ports 265. As discussed in more detail below, if redundant signals are used (for example, two redundant signals routed in different directions), an automated decision may be made to determine which of the redundant signals to pass to the client-drop ports 265. If desired, the automated selection process can be disabled, under software control. Interface cards can be provided for the cross-connect 250 to convert one or more of the client drop signals to another wavelength, such as a wavelength within the 1548 to 1561 nm band.

For path protected operation, one or more of the client add-signals may be bridged to two output ports on the cross-connect 250, which are routed to the single-channel ports on the multiwavelength terminal multiplexer 230. The client-add signal may have the same wavelength in each direction or different wavelengths. At the same time, the incoming signals on that wavelength are routed to the corresponding client-drop ports 265 on the cross-connect 250. With the path protection approach, the same drop signal comes from each direction, and the cross-connect 250 makes an automated decision as to which one to route to the client drop port 265.

In normal operation, the cross-connect 250 routes pass-through signals to the corresponding signal-channel input ports on the multiwavelength terminal multiplexer 230. The multiwavelength terminal multiplexer 230 functions to multiplex the signals received from cross-connect 250 and output multiplexed signals on one or more optical fibers.

Similar to demultiplexer 210, multiwavelength terminal multiplexer 230 may include one or more multiplexer blocks, for example, multiplexer blocks 230a and 230b, as shown in FIG. 2. Of course, the multiwavelength terminal multiplexer 230 may include more than two demultiplexer blocks. Each multiplexer block 230a, 230b receives optical signals from cross-connect 250. For example, in a bi-directional ring architecture deployment, multiplexer block 230a may receive optical signals for multiplexing into a first multiwavelength optical signal for propagation in a first direction (e.g., East-to-West) and second multiplexer block 230b may receive optical signals for multiplexing into a second multiwavelength optical signal for propagation in a second direction (e.g., West-to-East). As shown in the embodiment illustrated in FIG. 2, multiplexer blocks 230a and 230b each receive eight optical signals and generate a multiwavelength optical signal having eight different wavelengths.

More specifically, add and pass-through signals are coupled from cross-connect 250 to the multiplexer blocks 230a, 230b. Within multiplexer blocks 230a, 230b, the optical signals may be detected by receivers 231a, 231b and the resulting electronic signals used to drive optical transmitters 238a, 238b at the appropriate wavelengths. Signals, for example, at OC-48, OC-12, or OC-3 data rates, may be regenerated once more using CDR circuitry 235a, 235b, and the J0 and B1 bytes of SONET OC-48 signals may be again monitored. This final regeneration and monitoring is not required, but provides improved reliability and does not cause any signal impairments. Further, with such full regeneration, the scalability of the network to large numbers of nodes is virtually unlimited. The CDR circuits 235a, 235b can be bypassed, providing transparency for signals at data rates other than OC-48, OC-12 or OC-3, and possibly for analog FM-modulated signals, but for such non-reclocked signals the number of network elements that can be traversed is to be determined. The optical signals output from transmitters 238a, 238b may be supplied to an equalization unit 239a, 239b. The integrated equalization units 239a, 239b monitor the individual channel powers and to adjust (e.g., attenuate) them to constant powers. The individual signals are multiplexed together by multiplexers 236a, 236b to generate multiplexed optical signals. The multiplexed optical signals are amplified by optical amplifiers 234a, 234b and output over terminal interfaces 232a, 232b.

Of course, other configurations of the multiplexer blocks 230a, 230b can be implemented in accordance with the present invention. For example, multiplexer blocks 230a, 230b may be all optical. In this configuration, receivers 231a, 231b, CDR circuitry 235a, 235b, and transmitters 238a, 238b can be omitted. Alternatively, the multiplexer blocks 230a, 230b may receive electrical signals. Here, transmitters 258a–258d and receivers 231a, 231b as well as one pair of CDR circuitry 254c, 245d or 235a, 235b may be omitted.

The multiwavelength terminal demultiplexer blocks 230a, 230b may be equipped with multiplexers (not shown) to add OSC signals at a wavelength, for example, of 1510 nm, to the multiplexed optical signals. The OSC signals may be received at ports 237a, 237b. The demultiplexer blocks 230a, 230b may further include optical power monitoring equipment, such as total power monitors 240a, 240b that use a tap to provide a sample of the multiwavelength optical signal. Additional output ports, e.g., output ports 233a, 233b, may be provided to output samples of multiwavelength optical signals, e.g., for analysis of the multiwavelength signal with external test elements.

The operation of the transport interfaces 212 and 232 according to the system of FIGS. 1 and 2 will now be explained. While FIGS. 1 and 2 illustrate network elements that supports one to eight signal channels, greater numbers of signal channels may be implemented. Here, wavelengths on the International Telecommunications Union (ITU) compliant signal channel grid are preferred, but other wavelengths may be selected. Further, of the many ITU compliant signal channel wavelengths, any wavelengths may be selected. Table 1 provides eight ITU compliant signal channel wavelengths of a particular implementation.

TABLE 1

| | Signal channel wavelengths | |
|---|---|---|
| Channel | Vacuum Wavelength (nm) | Frequency (THz) |
| 1 | 1549.315 | 193.50 |
| 2 | 1550.918 | 193.30 |
| 3 | 1552.525 | 193.10 |
| 4 | 1554.134 | 192.90 |
| 5 | 1555.747 | 192.70 |
| 6 | 1557.364 | 192.50 |
| 7 | 1558.983 | 192.30 |
| 8 | 1560.606 | 192.10 |

Here, signals originating from the network element of the present invention may have optical frequencies within 110 GHz of the frequencies listed in Table 1. Further, the input transport interfaces 212 preferably support signals within ±25 GHz of the frequencies listed in Table 1. The transport interfaces 212 and 232 also support an optical service channel (OSC) at a wavelength, for example, of 1510 nm. To stabilize the gain of the optical amplifiers, the transport interfaces 212 and 232 may utilize a signal at a predetermined wavelength, for example, 1545 nm.

The output transport interfaces 232 preferably supply the signal channels at a power level of +5 dBm ±1 dBm (per channel), and the input transport interfaces 212 receive signal channels with levels of −20 to −10 dBm (per channel), with a ±1 dBm overall uniformity. Here, the optical amplifiers in the network element is preferably stabilized to maintain constant gain in the presence of changing numbers of channels. To accomplish this, the transport interfaces 212 and 232 may employ an all-optical stabilization technique to rapidly compensate for changing channel numbers and to stabilize subsequent amplifiers. For example, such compensation can be accomplished within 1 μs. The output optical amplifiers automatically generate a stabilization signal (for example, at 1545 nm) to replace any missing channels. This stabilization signal propagates along with the data signals, stabilizing any line amplifiers (WAMPs), and the input amplifier of the next WADM network element.

As mentioned above, the total input and output optical power may be monitored at the transport interfaces 212 and 232 to be reported to the network element controller 118 of FIG. 1. Samples of the amplified input and output optical signals may be routed to connectors on the front panel for use with external test and monitoring equipment. As reflected in FIG. 2, the total optical power at the input TIs 212 is monitored with a fast-response detector 215. The optical service channel (OSC) signal (for example, at 1510 nm) is then stripped off, and the remaining signals are provided to the input optical amplifier 214. The amplifier 214 has internal power monitors that report the input and output total optical power levels. After the amplifier, predetermined portion of the output power (e.g., 1%) is tapped off and routed to the front panel monitor connector 213. The signal at the monitor port will include the amplifier stabilization signal (for example, at 1545 nm) generated by the output amplifier of the previous network element.

As further reflected in FIG. 2, the total optical power at the output of the multiplexer 236 may be monitored with a fast-response detector 240. The multiplexed signals are then provided to the output optical amplifier 234, which includes the all-optical stabilization feature referred to above. The OSC signal is added to the amplifier output, and a predetermined percentage of the final signal (e.g., 1%) is tapped off and routed to the front panel monitor connector 237. The signal at the monitor port 237 may include the OSC channel (for example, at 1510 nm) and the amplifier stabilization signal (for example, at 1545 nm). The amplifier 234 has internal power monitors of its input and output total optical powers, which are reported to the network element controller 118. Here, the amplifier input power levels may be difficult to interpret due to the optical stabilization channel. However, the amplifier output power level, after correction for the loss of the service channel multiplexer and monitor tap, is a measure of the total optical power of the signal channels and the stabilization channel being delivered to the TI output connector 232.

The operation of the client interfaces using client add/drop ports 260 and 265 according to the system of FIGS. 1 and 2 will now be explained. Input signals to the client interfaces can be at any wavelength, but are preferably between 1290 and 1570 nm. The output signals from the client interfaces can also be at any wavelength, but are preferably at a wavelength of 1310 nm ±20 nm. Input signals to the client interfaces can be at any power level, but between −18 and −3 dBm is preferred. The output signals from the client interfaces is preferred to be at a power level of −5 dBm, ±10 dB, but other power levels may be used. Input and output power levels are preferably monitored for all client interfaces, and reported to the network element controller 118. In an exemplary monitoring system, the input power levels are derived from the receivers, and the output power levels are derived from the laser back-facet monitors.

The WADM network element may provide a capacity of sixteen client interfaces or more according to the application. When protection switching is disabled for a given wavelength channel, separate client interfaces can be connected to the two directions of that channel. With protection switching disabled for all channels, sixteen or more client interfaces can be accommodated in the cross-connect. One embodiment provides eight client interfaces per WADM with additional interface cards optionally provided. In such cases, the optional interface cards for the cross-connect units may provide the drop signal at the 1550 nm band rather than the standard 1310 nm output.

In another configuration, compliant client interface (CCI) cards are provided for the multiwavelength terminal demultiplexer 210 and for the multiwavelength terminal multiplexer 230, which may provide fixed but fully transparent optical add and drop, thereby passing signals at other data rates, including rates greater than 2.5 Gb/s. These cards may include power level monitors for both add and drop. Since the signals passing through these cards in this exemplary embodiment completely bypass the cross-connect, none of the features provided by the cross-connection, such as protection switching and configurability, are necessarily provided for these signals. The signal level of the dropped signal will be at least −15 dBm. Client-add signals are preferably at a specific wavelength with a power level of at least −5 dBm.

In yet another option, interface cards for the multiwavelength terminal demultiplexer 210 and multiwavelength terminal multiplexer 230 provide fixed fully transparent optical pass through capability. Because of the difference between the input and output signal levels, such cards may include optical amplifiers.

The operation of the service channel interfaces according to the system of FIGS. 1 and 2 will be further explained. The service channel signal is operated at a predetermined wavelength, for example, 1510±10 nm. For the OSC signal, the loss between the input transport interface connector 212 and the service channel output connector 217, and between the service channel input connector 237 and the output transport interface connector 232 is less than 3.5 dB. Here, the input signal channels may be a potential crosstalk source for the service channel receiver. For the signal channels, the loss between the input transport interface connector 212 and the service channel output connector 217 can be made less than 50 dB.

The operation of the craft client Graphical User Interface (GUI) according to the system of FIGS. 1 and 2 will now be explained. As previously discussed, the network element includes a text-based and GUI for craft operations. While other GUIs may be used, the craft interface GUI is integrated into a PC network element (NE) controller, for example, using a Pentium processor operating under a Windows environment.

In one embodiment, the WADM network element 200 provides clock recovery at operating data rates, including the OC-48, OC-12, and OC-3 data rates. For SONET OC-48 signals, the WADM network element of FIG. 2 further provide JO section trace monitoring for end-to-end recognition of individual SONET streams and provides BIP-8 parity error detection (B1 byte). Here, SONET OC-48, OC-12, or OC-3 signals (pass-through, add or drop) are fully regenerated, thereby removing noise and jitter present on the incoming signals, as well as noise and/or jitter introduced by the cross-connect switch. The clock and data recovery (CDR) circuits 254, 235 are preferably software programmable to set the data rate to be used. In addition, for both SONET and non-SONET OC-48 signals, the CDR circuits may extract and report the SONET section trace (J0) overhead bytes, and the section BIP-8 (B1) violations.

The WADM network element shall be able, under software control, to bypass CDR circuits 254, 235 to allow digital signals at other data rates. That is, digital signals at data rates other than OC-48, OC-12 or OC-3 (but less than 2.5 Gb/s) can be added, dropped, or passed by the network element of the preferred embodiment. However, these signals do not require retiming and reclocking. In this case, noise and jitter may accumulate and may limit the number of network elements that such signals can traverse. The maximum number of elements that can be traversed is therefore bit rate dependent. The limit to less than 2.5 GB/s is a consequence of the bandwidth of the receivers rather than the lack of regeneration. To operate in this mode the CDR circuits 235, 254 must be bypassed using, for example, software commands. Data in other signal formats, such as analog FM modulation, may pass through a very limited number of network elements with the CDR circuits 235, 254 bypassed using, for example, software commands. However, system performance should be evaluated for such other data signal formats.

As noted above, WADM network elements according to the present invention are capable of providing wavelength path protection switching in self-healing SONET rings within 50 ms. However, it may be desirable to disable, or to enable, the path protection switching feature through the local craft interface commands and remote network management commands. Wavelength path protected operation may be achieved as follows.

The establishment of path protection may be accomplished in a two-step process: setup the origin and enable protection at the destination. Establishing the path at the origin is done using the standard bridged connection facility. An add-client interface connection point is specified at the input source and two output connections points are specified as the destination, on each fiber. This operation does not differ from what would be done to establish a one-to-two point bridge connection. That is, when the path protection is enabled, a client-add signal is bridged to go out in both directions around the ring, for example, at the same wavelength.

On the destination side, establishing path protection may also be accomplished in a two step process: identify an incoming signal pair as a path protection set and a primary signal source, and activate protection. The first step at the destination is to signal the cross-connect switch 250 which two input signals are involved with a protected path connection. The last step would be activation of the protection path. At a drop node the two signals (from the two directions) are detected and monitored. The signal designated as the primary is routed to the output drop port. If the element detects a loss of signal condition for the primary signal, secondary path is changed to the primary, in which case the secondary signal is connected to the drop port. The threshold for the loss of signal condition is software programmable.

When the original primary signal returns, it is not restored as the signal source if it has been changed to a secondary role by the original failure. Restoration may be done by a command to change the original primary source back to the primary source. If the primary fails, and the secondary is also invalid, the primary role may be assumed by the first signal to restore. While both signals are invalid, the signal that has been designated as primary retains that designation.

For simplicity, the establishment and maintenance of a protected path at the termination end should be handled by a single new command. The command preferably has data fields such as: Output CP Identification, Primary Input CP Identification, Secondary Input CP Identification, Rate, and Activated (TRUE/FALSE). When initially received, the network element controller 118 sets up the connection and sets the activation mode, if all the ports are available. Since this command is actually a specialized switch fabric command, provisions in the switch fabric table are used for identifying such a setup. If the three ports are already involved in the same protected connection, two actions are possible. If the port now designated as primary is not the current primary port, it will assume this role. Further, if the activated field is different from that in place, then the switch hardware is notified of the change.

As noted above, the path protection mode can be enabled or disabled, under software control, for each individual channel. Here, when protection switching is disabled for a given channel (wavelength), the channel can transport two different signals in opposite directions. However, it may be necessary to utilize additional interface cards for the cross-connect.

The configurability of the network element according to the system of the exemplary embodiment of FIGS. 1 and 2 will now be explained. The WADM network element has eight client interfaces, and can add and drop signals on any number and combination of eight channels, while passing through signals on all channels that are not being added or dropped under software command for establishing connections. While pass-through signals normally enter and exit the WADM on the same channel, the cross-connect allows wavelength interchange on pass-through signals using, for example, software commands.

Each cross-connect switch fabric may processes signals on four wavelength channels, and thus wavelength interchange is done within a group of four wavelengths. The cross-connect allows reconfiguration of the assignments of client interfaces to wavelength channels. The four client interfaces on a particular cross-connect switch can be configured to add and drop any of the four wavelength channels handled by that switch according to software commands. The electronic switch fabric in the cross-connect can bridge any of its input ports to any combination of its output ports. The simplest use of this feature is for path protection wherein an add signal is bridged to go out on both output fibers on the same wavelength.

For multicast operation, an input signal or an add signal can be bridged to go out on more than one wavelength channel (within the group of four wavelengths processed by that switch), with or without path protection. Similarly, an input signal can be bridged to one or more drop ports and to one or more output ports, thereby providing a generalized drop and continue functionality using software commands. In addition to bridging an input port to multiple output ports, the electronic switch fabric can also dump the signal on an input port. Thus, an add signal can be sent out on a given wavelength channel while the input signal on that channel is dumped rather than being routed to a drop port. Similarly, an input signal can be routed to a drop port while any signal on the corresponding add port is dumped rather than being sent out on the line.

Figure 3:
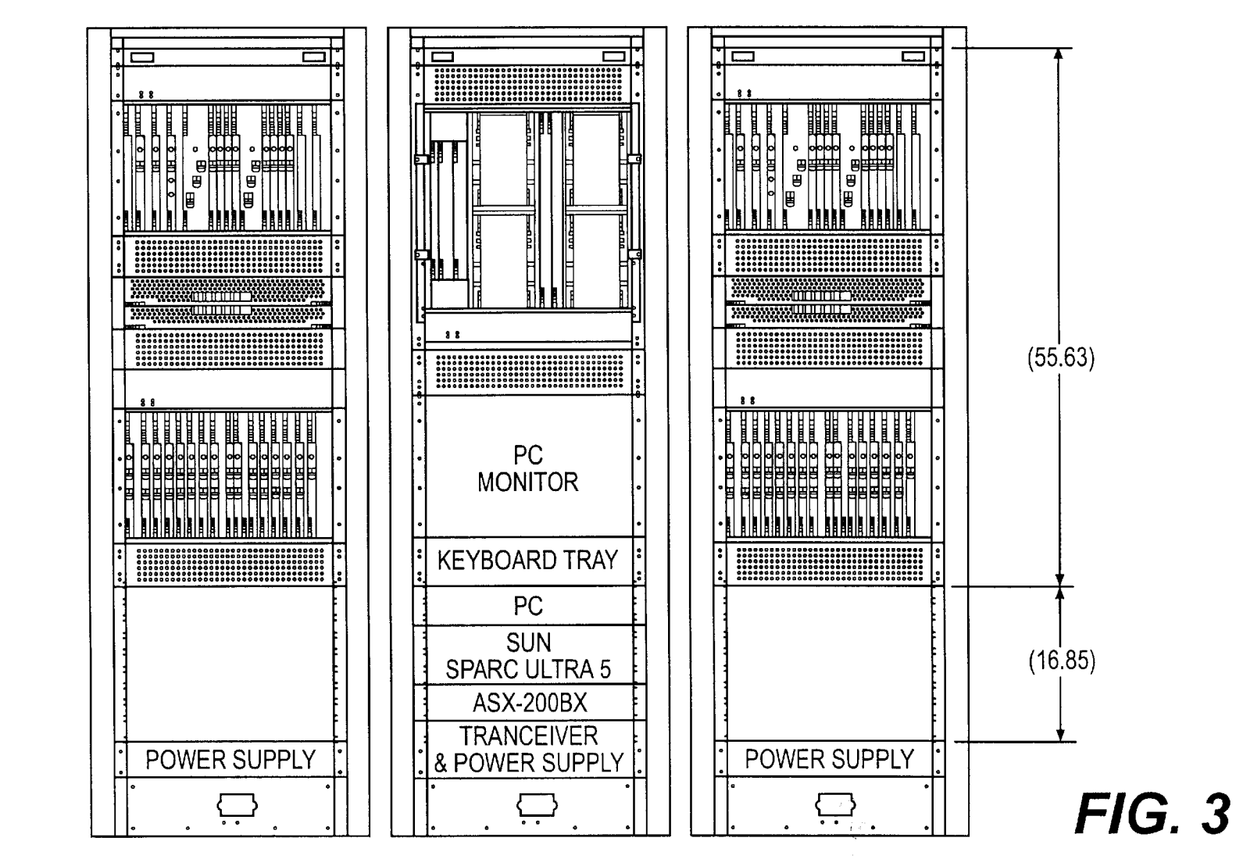
FIGS. 3 and 4 show the physical configuration in a telecommunication bay of WADM and WAMP network elements, respectively.

The preferred network element fits within standard telecommunications bays (e.g., 7' height and 23.5" width). FIG. 3 illustrates a bay arrangement for a network element according to the present invention. As shown in FIG. 3, the WADM network element occupies three bays. The outer two bays may contain the wavelength terminal demultiplexer 210 and wavelength terminal multiplexer 230 (e.g., WDM80TM terminal sub-elements). The center bay may contain the cross-connect 250 (e.g., a dual WXC4816 sub-element) and the Windows PC 114 for interfacing to the NMS system 112. The center bay includes space for an NMS workstation 112, an ATM switch 110, and transceivers for the optical service channel. There is also space available in the outer two bays for AC power supplies, if the WADM operated in a location that does not have power available −48 VDC.

Figure 4:
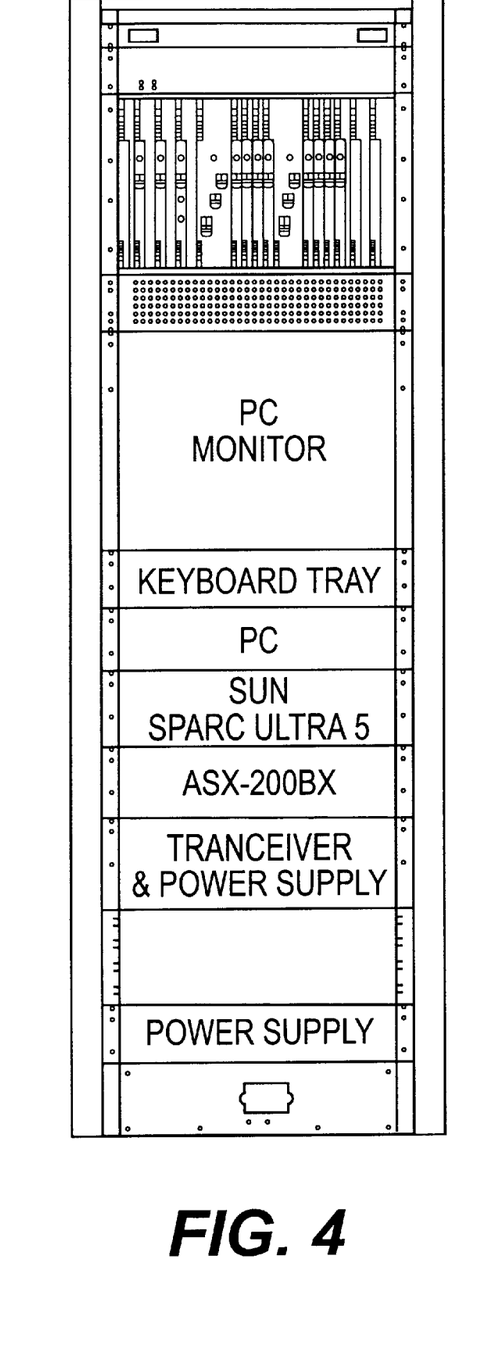

As shown in FIG. 4, a WAMP network element may occupy a single bay. This bay includes the amplifier (e.g., an WDM80MA amplifier shelf) and the Windows PC 114 for interfacing to the NMS system 112. There is space in the bay for an NMS workstation, an ATM switch 110, and transceivers for the optical service channel. Space is also available in the bay for AC power supplies if the WAMP is operated in a location that does not have power available at −48 VDC. Here, the network sub-elements may be designed to support dual −40 to −62 V DC power feeds. In a particular implementation, the power requirements for the various sub-elements are given in Table 2.

TABLE 2

Power requirements at −48VDC for network sub-elements

| Network sub-element | Power (W) |
|---|---|
| WDM80TM terminal, with 8 transponder cards | 410 |
| Dual WXC4816 cross-connect, with 8 client interface cards | 580 |
| WDM80MA multiwavelength amplifier | 200 |
| Total for WADM (2 terminals + 1 cross-connect) | 1400 |

In addition, each network element will require up to 450 W of 110 VAC power for the Windows PC. Additional, AC power should be provided for any additional equipment.

For network elements in locations that do not have power available at −48 VDC, 110 AC can be converted. For the WADM, two power converters are preferred, as illustrated in FIG. 3. These would provide dual power feeds to all three bays, thereby protecting against power supply failures. For the WAMP only a single supply is shown in FIG. 4, but an additional supply may be included if a dual feed is desired. Of course, the network element of the preferred embodiment complies with NEBS level 1 requirements.

The WADM and WAMP network elements operate in association with embedded Network Element Controllers (NEC) 118 and micro-controllers on the opto-electronic modules. The NEC 118 and the micro-controller enable the optical monitoring, optical protection switching and configuration functionality. In addition, a controller, such as a Windows PC, is provided that supports a graphical craft interface and an interface to the network control and management (NC&M) system.

Figure 5:
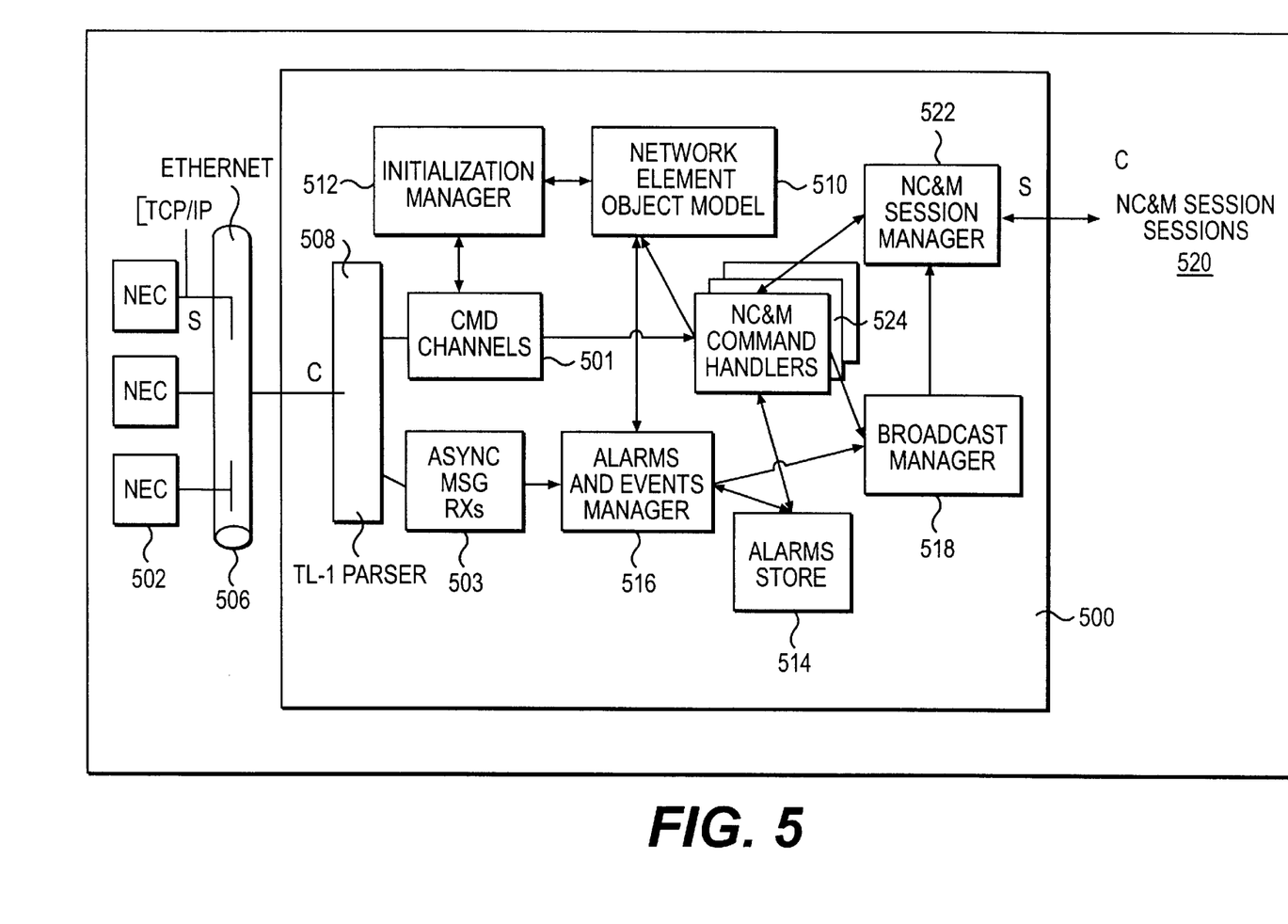
FIG. 5 is a diagram of the functionality components of the protocol converter.

A PC normalizer/protocol converter system acts as the interface between the network elements and the NC&M. FIG. 5 identifies the major functional components of the protocol converter 500. A network element controller (NEC) 502 is the controlling intelligence of a network sub-element. Typically, for a WAMP, there is one NEC, and for a WADM, there are three. From a logical view, the WADM appears to the NC&M as a single entity. In actuality, the WADM internally may consist of three separate network sub-elements, two terminal multiplexers and a cross connection switch. The PC normalizer/protocol converter 500 handles all the details to have the WADM appear as a unified entity.

The NECs communicate with the PC normalizer/protocol converter 500, for example, via twisted pair Ethernet connections 504. TCP/IP over Ethernet is used at the session level. Of course, the NECs and the PC normalizer/protocol converter 500 may communicate over other media and/or protocols. In FIG. 5, the "S" and "C" symbols, next to external connections, specify the client/server relationship of the connection. In the PC normalizer/protocol converter connections, the PC normalizer/protocol converter 500 is the client, and the NECs 502 are the servers. That is, the PC normalizer/protocol converter 500 is responsible for establishing the TCP/IP connections.

In a preferred embodiment, TL-1 is the native language of the NECs 502. A parser 508, and a set of internal objects, may included in the PC normalizer/protocol converter to abstract TL-1 specific issues. Within the PC normalizer/protocol converter 500, a TCP/IP connection will be established to each NEC for command interaction. These commend channels 500 are used for PC normalizer/protocol converter initiated interactions. Here, a WAMP has one command channel 501, while a WADM has three.

Within the PC normalizer/protocol converter 500, a TCP/IP connection is established to each NEC 502 for reception of asynchronous/autonomous messages 503. When a message is received, it passes to the alarms and events manager 516 for processing.

The PC normalizer/protocol converter 500 includes an object model 510 for the associated network element. The object model 510 is maintained according to whether the PC normalizer/protocol converter 500 is operated in the operational or simulator mode. In the operational mode, the PC normalizer/protocol converter 500 interacts with the NEC 502 to set and fetch information. In the simulator mode, the object model 510 includes default information for satisfying any NC&M request. The setting of the PC normalizer/protocol converter mode is a compile time option using the compiler's preprocessor capabilities.

When the PC normalizer/protocol converter 500 is started, the initialization manager 512 updates the internal object model 510 and alarm store 514. If the PC normalizer/protocol converter 500 is in the simulator mode, the object 510 is initialized using default values. If the model 510 is in the operational mode, the associated NECs 502 are accessed to obtain the necessary information to synchronize the internal object model 510. This initialization includes configuration, switch tables and outstanding alarms.

The alarms and events manager 516 receives message objects from the asynchronous message receivers. The manager 516 then processes the message and determines the required actions. Depending upon the message, one or more actions may be taken such as updating the internal object model 510, issuing an NC&M alarm, issuing an NC&M alarm clear, updating NC&M alarms store, issuing an NC&M alert, and issuing a NC&M notification. The manager 516 utilizes the services of the broadcast manager 518 for sending asynchronous messages to attached NC&M systems.

The alarms store 514 hold outstanding port and shelf alarms. NC&M system 520 establishes a connection with the PC normalizer/protocol converter via a TCP/IP session, over ATM. The NC&M system 520 acts as the client, and initiates the TCP/IP call.

When a session is initiated by a NC&M, a logon command is used to setup the session, the session can request whether asynchronous messages are to be sent over the connection. When multiple requests are sent to the PC normalizer/protocol converter 500 and stored in the TCP/IP buffers, serial processing of the commands is used. Command responses are returned in the order of request reception. If asynchronous messages are requested, then the broadcast manager 518 interacts with the session manager 522 for sending messages. If commands are processed on a session connection, having a asynchronous messaging enabled, then it is possible for asynchronous messages to be interspersed with command replies.

For each NC&M command/requested supported, an associated command handler 524 in the PC normalizer/protocol converter is provided. The handlers 524 are responsible for validation and execution of the request. Depending upon the mode of the PC normalizer/protocol converter, operational or simulator, the handler 524 accesses and updates the internal object model and/or the proper NEC(s). In the operational mode, the proper NEC commands are issued to affect changes in the hardware, such as switch operations. In simulator mode, the internal object model 510 are updated to reflect operational changes. When accessing the NECs, the command channels 501 are used. When a command generates a notification message, the broadcast manager 518 is utilized. That is, the broadcast manager 518 is responsible for distribution of asynchronous messages to all NC&M connections that have requested them.

As discussed above, the system of the present application provides a number of distinct advantages. The network element provides wavelength interchange. Accordingly, within each group of four wavelengths, the pass-through signals are converted to any desired wavelength within the group. Client interface configurability is achieved. That is, each client interface of each group of four client interfaces add and drop from any desired wavelength channel within a group of four wavelengths. Client interfaces not being used for add/drop can be configured for loopback within the same client interface or between such client interfaces.

Dump capability allows the network element to add a client signal and to dump the incoming signal on that wavelength rather than routing it to the corresponding client drop port. Similarly, a signal to a client may be dropped and dumped from the corresponding client add port.

Drop/continue and broadcast capability is achieved, thereby allowing an incoming signal, from an input TI or a client add port, to be bridged to go out on more than one wavelength channel within a group of four wavelengths. This feature is enabled with or without the path protection enabled.

An increased number of client interfaces is provided. As shown in the exemplary embodiment of FIGS. 1 and 2, up to sixteen client interfaces are provided. Here, by adding up to four optional interface cards to each of the cross-connects, the WADM element can have up to sixteen NCIs. These interfaces may be used to route two different (and unprotected) signals in opposite directions on the same wavelength. Further, the directions of those two signals are provisionable. Of course, other numbers of client interfaces may be implemented in other embodiments of the present invention.

With overhead monitoring, CDR elements also recover SONET J0 and B1 overhead bytes, thereby providing verification of the signal identity and the switch configuration as well as information on signal BERs. Overhead monitoring is particularly desirable with data signals such as OC-48, but may also be used with OC-12 and OC-3 signals.

The number of wavelength channels in the network element of the present application is easily upgradeable. For example, as shown in the example of FIGS. 1 and 2, the common elements of the wavelength terminal multiplexer input and output are configured for sixteen wavelength channels, with 100 GHz channel spacings. Thus, by adding additional interface cards to the WDM400TM units, and adding two additional cross-connects, the WADM element is upgradeable to sixteen-channel operation. The element then has the same wavelength interchange and client interface configurability (within groups of four) as the eight-channel element. Such upgrades may be advantageous for follow-on programs.

It will be apparent to those skilled in the art that various modification and variations can be made in the network element of the present invention without departing from the spirit or scope of the invention. Thus, it is intended that the present invention cover the modifications and variations of this invention provided they comp within the scope of the appended claims and their equivalents.

What is claimed is:

1. A reconfigurable multiwavelength network element for a bidirectional network ring having first and second optical paths corresponding to clockwise and counter-clockwise directions, comprising:

a first demultiplexer unit coupled with the first optical path, the first demultiplexer unit having a first input for receiving a first multiwavelength signal over first optical path and having first outputs for outputting at least a first signal and a second signal demultiplexed from the first multiwavelength signal;

a second demultiplexer unit coupled with the second optical path, the second demultiplexer unit having a first input for receiving a second multiwavelength signal over the second optical path and having second outputs for outputting at least a third signal and a fourth signal demultiplexed from the second multiwavelength signal;

a cross-connect unit for optically switching optical signals, wherein the cross-connect unit includes a first receiver to receive the first signal, a second receiver to receive the third signal, and a third receiver to receive a first client add signal, the cross-connect unit directing the first signal the third signal and the first client add signal to first, second, and third transmitters, and wherein the cross-connect unit further includes a fourth receiver to receive the second signal, a fifth receiver to receive the fourth signal, and a sixth receiver to receive a second client add signal, the cross-connect unit directing the second signal, the fourth signal and the second client add signal to fourth, fifth, and sixth transmitters;

a first multiplexer unit interconnected with the third and fourth transmitters to multiplex together the respective signals, wherein the first transmitter provides a first client drop signal; and a second multiplexer unit interconnected with the second and sixth transmitters to multiplex together the respective signals, wherein the fifth transmitter provides a second client drop signal.

2. The reconfigurable multiwavelength optical network element according to claim 1, wherein the first demultiplexer unit includes a demultiplexer and an optical amplifier.

3. The reconfigurable multiwavelength optical network element according to claim 2, wherein the first demultiplexer unit further includes an second demultiplexer to drop an optical service channel.

4. The reconfigurable multiwavelength optical network element according to claim 2, wherein the demultiplexer unit further includes a tap to provide a sample of the multiwavelength signal to a power monitor.

5. The reconfigurable multiwavelength optical network element according to claim 1, wherein the optical cross-connect unit further includes clock and data recovery circuits.

6. The reconfigurable multiwavelength optical network element according to claim 1, wherein the first multiplexer unit includes a multiplexer and an optical amplifier, the optical amplifier generating a stabilization signal.

7. The reconfigurable multiwavelength optical network element according to claim 6, wherein the first multiplexer unit further includes an second multiplexer to add an optical service channel.

8. The reconfigurable multiwavelength optical network element according to claim 6, wherein the first demultiplexer unit further includes a tap to provide a sample of the multiwavelength signal to a power monitor.

9. The reconfigurable multiwavelength optical network element according to claim 1, wherein the first and second demultiplexer units respectively receive the same number of wavelengths from the first and second optical fibers.

10. The reconfigurable multiwavelength optical network element according to claim 1, wherein the signal switching is provided between the first and second optical fibers in a ring structure network.

11. A reconfigurable multiwavelength network element, comprising:

a demultiplexer unit for receiving and demultiplexing a multiplexed optical signal, the demultiplexer unit having optical outputs corresponding to channels of the multiplexed signal;

a first multiplexer unit having optical inputs for receiving signals to be multiplexed together; and a cross-connect unit to direct signals received from the optical outputs and a client add port to the optical inputs and a client drop port.

12. The reconfigurable multiwavelength optical network element according to claim 11, wherein the cross-connect unit includes a cross-connect, a first clock and data recovery circuit, and a second clock and data recovery circuit, the first and second clock and data recovery circuits being before and after the cross-connect.

13. The reconfigurable multiwavelength optical network element according to claim 11, wherein the multiplexer unit includes a clock and data recovery circuit.

14. The network element according to claim 1, wherein path protection is provided when the first optical path is broken by routing signals from the first optical path via the second optical path.

* * * * *